United States Patent
Rallison

[19]

[11] Patent Number: 5,903,396
[45] Date of Patent: May 11, 1999

[54] INTENSIFIED VISUAL DISPLAY

[75] Inventor: Richard Dennis Rallison, Paradise, Utah

[73] Assignee: i/O Display Systems, LLC, Menlo Park, Calif.

[21] Appl. No.: 08/953,093

[22] Filed: Oct. 17, 1997

Related U.S. Application Data

[63] Continuation of application No. 08/307,670, filed as application No. PCT/US94/01391, Feb. 7, 1994, abandoned.

[51] Int. Cl.$^6$ .................................................. G02B 27/14
[52] U.S. Cl. ........................ 359/630; 359/13; 359/487; 359/495; 359/497; 345/8
[58] Field of Search ................ 359/13, 14, 495, 359/497, 629, 630, 631, 487; 345/7, 8, 9

[56] References Cited

U.S. PATENT DOCUMENTS

| | | | |
|---|---|---|---|
| D. 300,476 | 3/1989 | Sestak | D29/18 |
| D. 301,644 | 6/1989 | Sestak | D29/18 |
| D. 334,557 | 4/1993 | Hunter et al. | D14/114 |
| D. 334,742 | 4/1993 | Hunter et al. | D14/113 |
| D. 337,320 | 7/1993 | Hunter et al. | D14/113 |
| D. 338,514 | 8/1993 | Holmes | D21/240 |
| 2,955,156 | 10/1960 | Heilig | 178/6.5 |
| 2,958,258 | 11/1960 | Kelly | 88/24 |
| 3,043,910 | 7/1962 | Hicks | 178/7.85 |
| 3,589,795 | 6/1971 | Miyazaki et al. | 350/96 B |
| 3,614,314 | 10/1971 | Rossire | 178/7.88 |
| 3,874,783 | 4/1975 | Cole | 350/96 B |
| 3,915,548 | 10/1975 | Opittek et al. | 350/3.5 |
| 3,923,370 | 12/1975 | Mostrom | 350/55 |
| 3,940,204 | 2/1976 | Withrington | 350/3.5 |
| 4,028,725 | 6/1977 | Lewis | 358/103 |
| 4,042,957 | 8/1977 | Ellis | 358/109 |
| 4,048,653 | 9/1977 | Spooner | 358/104 |
| 4,257,062 | 3/1981 | Meredith | 358/81 |

(List continued on next page.)

FOREIGN PATENT DOCUMENTS

| | | |
|---|---|---|
| 91309108 | 10/1991 | European Pat. Off. . |
| 0 461 942 A1 | 12/1991 | European Pat. Off. .......... G09B 9/32 |
| 0 566 004 A2 | 10/1993 | European Pat. Off. ........ G02B 27/00 |
| 2517916 | 6/1983 | France .............................. H04N 9/54 |
| 2 690 534 | 10/1993 | France ........................... G02B 27/30 |

(List continued on next page.)

OTHER PUBLICATIONS

Foley, Interfaces for Advanced Computing, *Scientific American*, Oct. 1987, vol. 257, No. 4, pp. 126–135.

Krueger, *Artificial Reality II*, 1991 Addison–Wesley Publishing Company, Inc., pp. 66–82, 102–116, 130–149, 179–182, 237–239, 267–279.

Sutherland, "A head–mounted three dimensional display", Fall Joint Computer Conference, 1968, pp. 757–763.

Antonoff, "Real estate is cheap here, but the places you'd most to visit are still under construction", *Popular Science*, Jun. 1993, pp. 83–86, 124–125.

(List continued on next page.)

*Primary Examiner*—Cassandra Spyrou
*Assistant Examiner*—Darren E. Schuberg
*Attorney, Agent, or Firm*—Sheridan Ross P.C.

[57] ABSTRACT

The intensified visual display relates to visual displays which combine generated images with the view of the environment surrounding a user and transmit such combined visual information to the eye position of the user. A fold mirror (1) frequently utilized in such displays reflects only a fraction of the light striking it and, similarly, transmits only a different fraction of the light reaching it. The fold mirror (1) will reflect a maximum amount of light when such light is S polarized and transmit a maximum amount of light when the light is P polarized. If the image generator produces S polarized light, one quarter-wave plate (3) is used to assure that image light to be reflected by the fold mirror (1) is S polarized while image light to be transmitted through the fold mirror (1) is P polarized. If the image generator produces P polarized light, a first quarter-wave plate (31) and a second quarter-wave plate (32) are employed.

20 Claims, 4 Drawing Sheets

U.S. PATENT DOCUMENTS

| | | | |
|---|---|---|---|
| 4,269,476 | 5/1981 | Gauthier et al. | 350/174 |
| 4,310,849 | 1/1982 | Glass | 358/88 |
| 4,322,135 | 3/1982 | Freeman | 350/410 |
| 4,348,185 | 9/1982 | Breglia et al. | 434/43 |
| 4,361,384 | 11/1982 | Bosserman | 350/174 |
| 4,385,803 | 5/1983 | Ellis | 350/174 |
| 4,395,731 | 7/1983 | Schoolman | 358/88 |
| 4,398,799 | 8/1983 | Swift | 350/174 |
| 4,437,113 | 3/1984 | Lee et al. | 358/93 |
| 4,439,157 | 3/1984 | Breglia et al. | 434/40 |
| 4,446,480 | 5/1984 | Breglia et al. | 358/104 |
| 4,465,347 | 8/1984 | Task et al. | 350/538 |
| 4,468,101 | 8/1984 | Ellis | 350/538 |
| 4,550,984 | 11/1985 | Reymond | 350/404 |
| 4,559,555 | 12/1985 | Schoolman | 358/88 |
| 4,561,723 | 12/1985 | Hamano et al. | 350/331 R |
| 4,571,628 | 2/1986 | Thornton | 358/224 |
| 4,630,040 | 12/1986 | Haertling | 340/763 |
| 4,636,866 | 1/1987 | Hattori | 358/236 |
| 4,641,931 | 2/1987 | Loy | 350/538 |
| 4,651,201 | 3/1987 | Schoolman | 358/98 |
| 4,652,870 | 3/1987 | Steward | 340/705 |
| 4,653,875 | 3/1987 | Hines | 350/442 |
| 4,695,129 | 9/1987 | Faessen et al. | 350/96.25 |
| 4,706,117 | 11/1987 | Schoolman | 358/88 |
| 4,711,512 | 12/1987 | Upatnieks | 350/3.7 |
| 4,737,972 | 4/1988 | Schoolman | 378/41 |
| 4,743,200 | 5/1988 | Welch et al. | 434/43 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,763,990 | 8/1988 | Wood | 350/320 |
| 4,775,217 | 10/1988 | Ellis | 350/538 |
| 4,786,966 | 11/1988 | Hanson et al. | 358/108 |
| 4,796,987 | 1/1989 | Linden | 351/158 |
| 4,797,736 | 1/1989 | Kloots et al. | 358/93 |
| 4,799,765 | 1/1989 | Ferrer | 350/174 |
| 4,805,988 | 2/1989 | Dones | 350/137 |
| 4,806,011 | 2/1989 | Bettinger | 351/158 |
| 4,807,202 | 2/1989 | Cherri et al. | 367/129 |
| 4,826,287 | 5/1989 | Cook et al. | 350/174 |
| 4,853,764 | 8/1989 | Sutter | 358/3 |
| 4,859,030 | 8/1989 | Rotier | 350/174 |
| 4,859,031 | 8/1989 | Berman et al. | 350/174 |
| 4,867,551 | 9/1989 | Perera | 351/158 |
| 4,869,575 | 9/1989 | Kubik | 350/174 |
| 4,874,214 | 10/1989 | Cheyason et al. | 350/3.7 |
| 4,874,235 | 10/1989 | Webster | 351/201 |
| 4,884,137 | 11/1989 | Hanson et al. | 358/108 |
| 4,884,219 | 11/1989 | Waldren | 364/514 |
| 4,897,715 | 1/1990 | Beamon | 358/93 |
| 4,900,133 | 2/1990 | Berman | 350/346 |
| 4,902,083 | 2/1990 | Wells | 350/6.6 |
| 4,902,116 | 2/1990 | Ellis | 350/501 |
| 4,902,120 | 2/1990 | Weyer | 351/158 |
| 4,904,049 | 2/1990 | Hegg | 350/96.27 |
| 4,930,888 | 6/1990 | Freisleben et al. | 356/152 |
| 4,932,731 | 6/1990 | Suzuki et al. | 350/3.7 |
| 4,933,755 | 6/1990 | Dahl et al. | 358/88 |
| 4,934,773 | 6/1990 | Becker | 350/6.6 |
| 4,952,024 | 8/1990 | Gale | 350/143 |
| 4,961,625 | 10/1990 | Wood et al. | 350/174 |
| 4,961,626 | 10/1990 | Fournier et al. | 350/174 |
| 4,968,123 | 11/1990 | Fournier et al. | 350/538 |
| 4,969,714 | 11/1990 | Fournier et al. | 353/174 |
| 4,969,724 | 11/1990 | Ellis | 350/503 |
| 4,970,589 | 11/1990 | Hanson et al. | 358/108 |
| 4,973,132 | 11/1990 | McDonald et al. | 350/174 |
| 4,982,278 | 1/1991 | Dahl et al. | 358/88 |
| 4,983,014 | 1/1991 | Nattermann | 350/96.24 |
| 4,984,179 | 1/1991 | Waldern | 364/514 |
| 4,993,790 | 2/1991 | Vick | 350/3.73 |
| 4,995,165 | 2/1991 | Daniels | 33/361 |
| 5,003,300 | 3/1991 | Wells | 340/705 |
| 5,005,213 | 4/1991 | Hanson et al. | 455/617 |
| 5,019,828 | 5/1991 | Schoolman | 342/457 |
| 5,034,809 | 7/1991 | Katoh | 358/88 |
| 5,035,473 | 7/1991 | Kuwayama et al. | 350/3.7 |
| 5,039,198 | 8/1991 | VanBeek | 385/117 |
| 5,046,827 | 9/1991 | Frost et al. | 359/54 |
| 5,050,966 | 9/1991 | Berman | 359/38 |
| 5,053,755 | 10/1991 | Smith et al. | 340/705 |
| 5,081,542 | 1/1992 | Efron et al. | 359/41 |
| 5,089,903 | 2/1992 | Kuwayama et al. | 359/15 |
| 5,091,719 | 2/1992 | Beamon | 340/705 |
| 5,123,726 | 6/1992 | Webster | 351/201 |
| 5,124,821 | 6/1992 | Antier et al. | 359/14 |
| 5,129,716 | 7/1992 | Holakovszky et al. | 351/50 |
| 5,130,794 | 7/1992 | Ritchey | 358/87 |
| 5,138,555 | 8/1992 | Albrecht | 364/424.06 |
| 5,151,722 | 9/1992 | Massof et al. | 351/158 |
| 5,162,828 | 11/1992 | Furness et al. | 353/122 |
| 5,162,928 | 11/1992 | Taniguchi et al. | 359/13 |
| 5,164,848 | 11/1992 | Firth et al. | 359/13 |
| 5,166,778 | 11/1992 | Beamon | 358/3 |
| 5,170,153 | 12/1992 | Migozzi et al. | 340/705 |
| 5,184,231 | 2/1993 | Ellis | 359/13 |
| 5,189,512 | 2/1993 | Cameron et al. | 358/93 |
| 5,192,960 | 3/1993 | Komamura | 351/41 |
| 5,198,928 | 3/1993 | Chauvin | 359/465 |
| 5,200,844 | 4/1993 | Suvada | 359/40 |
| 5,231,379 | 7/1993 | Wood et al. | 340/705 |
| 5,255,211 | 10/1993 | Redmond | 364/578 |
| 5,274,405 | 12/1993 | Webster | 351/158 |
| 5,276,471 | 1/1994 | Yamauchi et al. | 351/153 |
| 5,278,680 | 1/1994 | Karasawa et al. | 359/40 |
| 5,281,957 | 1/1994 | Schoolman | 345/8 |
| 5,293,271 | 3/1994 | Merritt et al. | 359/858 |
| 5,300,942 | 4/1994 | Dolgoff | 345/32 |
| 5,303,085 | 4/1994 | Rallison | 359/631 |
| 5,305,244 | 4/1994 | Newman et al. | 364/708.1 |
| 5,320,538 | 6/1994 | Baum | 434/307 |
| 5,321,416 | 6/1994 | Bassett et al. | 345/8 |
| 5,322,441 | 6/1994 | Lewis et al. | 434/307 |
| 5,323,174 | 6/1994 | Klapman et al. | 345/156 |
| 5,331,149 | 7/1994 | Spitzer et al. | 250/221 |
| 5,334,991 | 8/1994 | Wells et al. | 345/8 |
| 5,335,299 | 8/1994 | Atkinson | 382/56 |
| 5,347,400 | 9/1994 | Hunter | 359/815 |
| 5,353,042 | 10/1994 | Klapman et al. | 345/156 |
| 5,357,372 | 10/1994 | Chen et al. | 359/637 |
| 5,373,857 | 12/1994 | Travers et al. | 128/782 |
| 5,383,053 | 1/1995 | Hegg et al. | 359/486 |
| 5,392,158 | 2/1995 | Tosaki | 359/633 |
| 5,408,346 | 4/1995 | Trissel et al. | 359/65 |
| 5,451,976 | 9/1995 | Ito | 345/8 |
| 5,526,184 | 6/1996 | Tokuhashi et al. | 359/630 |

FOREIGN PATENT DOCUMENTS

| | | | |
|---|---|---|---|
| 224691 | 7/1910 | Germany . | |
| 3532730 | 3/1987 | Germany | A61B 1/04 |
| 3628458 | 2/1988 | Germany | H04N 1/20 |
| 4225589A1 | 2/1994 | Germany | G09F 9/00 |
| 59-117889 | 7/1984 | Japan | H04N 9/54 |
| 59-219092 | 12/1984 | Japan | H04N 9/54 |
| 62-272698 | 11/1987 | Japan . | |
| 63-82192 | 4/1988 | Japan . | |
| 63-177689 | 7/1988 | Japan . | |
| 1-61723 | 3/1989 | Japan . | |
| 5-46161 | 2/1993 | Japan | G09G 5/36 |
| 6-59217 | 3/1994 | Japan | G02B 27/28 |
| 2 143 948 | 2/1985 | United Kingdom | G01C 1/00 |

| | | | |
|---|---|---|---|
| 2266385 | 10/1993 | United Kingdom | G02B 23/10 |
| 2270775 | 3/1994 | United Kingdom | G02B 27/02 |
| 2 279 201 | 12/1994 | United Kingdom | H04R 1/10 |
| 2 281 846 | 3/1995 | United Kingdom | A45F 3/00 |
| 84/01680 | 4/1984 | WIPO | H04N 5/64 |
| WO 92/03756 | 3/1992 | WIPO | G02B 27/00 |
| 93/23783 | 11/1993 | WIPO . | |
| WO 94/11855 | 5/1994 | WIPO | G09G 3/02 |
| WO 94/14152 | 6/1994 | WIPO | G09G 3/02 |
| WO 94/24658 | 10/1994 | WIPO | G09G 3/02 |
| WO 95/10061 | 4/1995 | WIPO | G02B 26/10 |
| WO 95/10106 | 4/1995 | WIPO | G09G 3/02 |

OTHER PUBLICATIONS

Burley, et al., "A full–color wide–field–of–view holographic helmet–mounted display for pilot/vehicle interface development and human factors studies", *SPIE*, vol. 1290 Helmet–Mounted Displays II (1990), pp. 9–15.

Carr, "Is Virtual Reality Virtually Here?", *Training & Development*, Oct. 1992, pp. 37–41.

Fisher et al., "Living in a Virtual World", *BYTE*, Jul. 1990, pp. 215–221.

Horn, "Seeing the invisible", *U.S. News & World Report*, Jan. 28, 1991.

James, "Goggles Brighten Dark Subway", *The New York Times*, Apr. 10, 1992.

Jones et al., "Evaluation of conformal and body–axis attitude information for spatial awareness", *SPIE*, vol. 1695 Helmet–Mounted Displays III (1992), pp. 146–153.

Starks, "Stereoscopic video and the quest virtual reality: an annotated bibliography of selected topics", *SPIE*, vol. 1457 Stereoscopic Displays and Applications II (1991), pp. 327–343.

Stewart, "Through the looking glass into an artificial world—via computer", *Smithsonian*, vol. 21, No. 10, Jan. 1991, pp. 36–45.

Assenheim et al., "Large–Screen–Projection, Avionic, and Helmet–Mounted Displays", Proceedings, The International Society for Optical Engineering, Feb. 26–28, 1991, vol. 1456, pp. 179–190.

Benton, "Practical Holography VIII", Proceedings, The International Society for Optical Engineering, Feb. 7–9, 1994, vol. 2176, pp. 241–248.

Driscoll et al., *Handbook of Optics*, McGraw–Hill Book Company, 1978, p. 13–6.

Fischer, "Fundamentals and Optics for Head Mounted Displays", Photonics West '95, Feb. 4–10, 1995.

Rotier, "Optical Approaches to the Helmet Mounted Display", *SPIE*, 1989, vol. 1116, pp. 14–17.

Sony, "Visortron" advertisement.

"Survey of Head Mounted Displays", *Real Time Graphics*, Aug. 1994, vol. 3, No. 2, pp. 1, 8–12.

Virtual I/O, Inc., "PDS Gamer™" advertisement.

*VR News*, Dec. 1994, vol. 3, Issue 10, pp. 4, 8, 12.

"Airlines Weigh Benefits, Costs of At–Seat Video", *Aviation Week & Space Technology*, Aug. 15, 1994, pp. 44–45.

Pope, "Say ahhh! Videos help you relax", *The Times–Picayune*, Oct. 25, 1994, pp. 1, A–6.

Farmer, "The right solution to the right problem . . . now", *Comdex Daily*, Nov. 15, 1994, p. 4.

Siggraph, *Nikkei Electronics*, Aug. 22, 1994, pp. 13–14.

Virtual I/O, "i–glasses!", *Twice CES Daily*, Jan. 6, 1995, p. 30.

Virtual I/O, Specifications, *Virtual Reality World*, Nov./Dec. 1994, p. 11.

Virtual I/O, *VR News*, Aug./Sep. 1994, p. 17.

INTENSIFIED VISUAL DISPLAY

This is a continuation of application Ser. No. 08/307,670, filed on Apr. 21, 1995, now abandoned, which is the U.S. National Phase of PCT/US94/01391 filed Feb. 7, 1994.

TECHNICAL FIELD

This invention relates to visual display which combine generated images with the view of the environment surrounding a user and transmit such combined visual information to the eye position of the user.

BACKGROUND ART

It is often desirable to provide visual information to a living being, usually a person. Frequently one wishes to superimpose such visual information upon the being's view of the real world.

Such a display requires, in a form known as a folded catadioptric display, an image generator; a beam splitter, which receives the image light from the image generator and sends a fraction, designated the reflected fraction, of such image light to a reflective combiner that both allows light from the real world to pass through such combiner and reflects the image light such that both the real-world light and the image light are transmitted to the eye of the user through the beam splitter.

The beam splitter will transmit a fraction, designated the transmitted fraction, of the image light reflected from the collimator-combiner. Of course, only a fraction of the real-world light is also transmitted by the beam splitter; but attention is directed only to the image light since it is image light that tends to be critically low in intensity.

To correct for aberrations and distortions produced by the beam splitter and the combiner, a correction lens is often placed in the optical path between the image generator and the beam splitter.

The light emitted from liquid crystal displays is linearly polarized because liquid crystal displays utilize polarizers to modulate amplitude. The only cathode ray tubes which produce linearly polarized light are those which are colored with an active wave plate, such as the Tektronics Pi cell, all of the light from which is linearly polarized.

When a fold mirror is selected as the beam splitter, it is plastic or glass having, preferably, a dielectric or holographic dichromated gelatin coating. Metal coatings are unacceptable because the fold mirror must first reflect light to the combiner and then transmit light from the combiner to the eye of the user.

DISCLOSURE OF INVENTION

As mentioned above, the loss of light associated with the fold mirror critically decreases the intensity of the image light transmitted to the eye position of the user.

The principal inventive concept associated with the present invention is the recognition of three facts: A fold mirror with a dielectric or holographic dichromated gelatin coating will reflect a maximum amount (and, consequently, transmit a minimum amount) of linearly polarized light when the E vector, representing the electric field associated with a light wave, is oscillating in a plane that is perpendicular to the plane of incidence of the light with the fold mirror (termed "S polarization"). Such a fold mirror will transmit a maximum amount (and, accordingly, reflect a minimum amount) of linearly polarized light when the E vector is oscillating in the plane of incidence of the light with the fold mirror (termed "P polarization"). And one or more wave plates can be inserted in the optical path of a folded catadioptric display to rotate the E vector such that the light reaching the fold mirror from the image generator is S polarized while the light arriving at the fold mirror from the combiner is P polarized.

When this is done, the amount of light from the image generator that reaches the eye position of the user is substantially increased.

Since a fiber optic faceplate depolarizes light to the extent that if all the light entering the faceplate is linearly polarized, only two-thirds of the light exiting the faceplate is so polarized, it is preferable to utilize this technique with a folded catadioptric display that incorporates no faceplate.

BEST MODE FOR CARRYING OUT THE INVENTION

Figure 1:
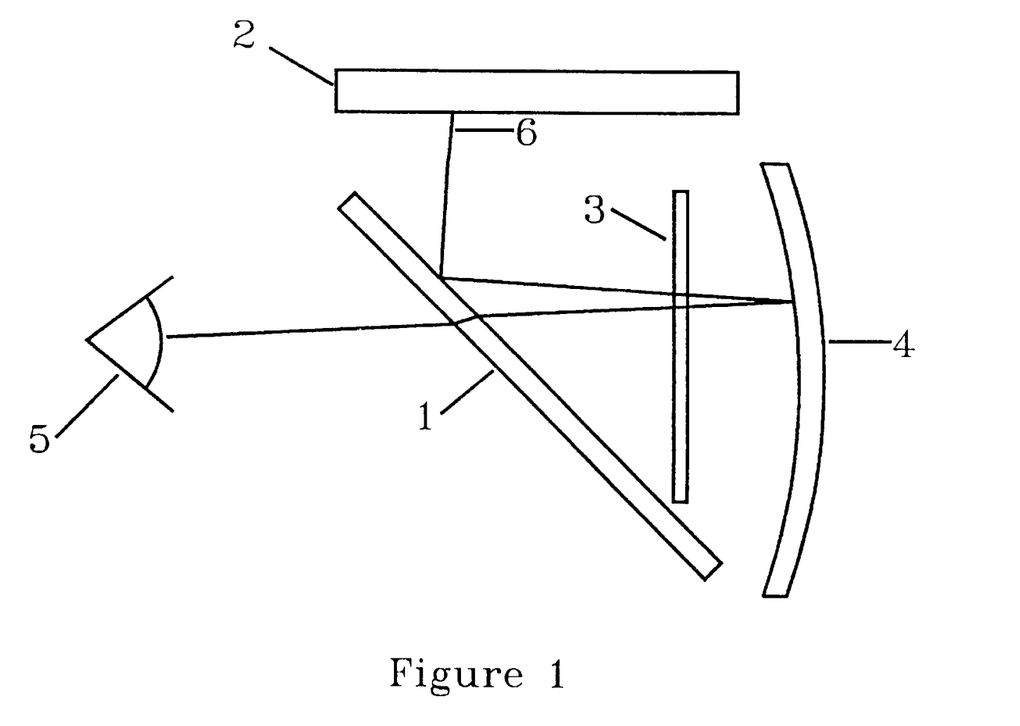
FIG. 1 shows the intensified visual display that is utilized when the image generator produces S polarized image light.

If the light from the image generator is S polarized, the user-mounted display comprises, as depicted in FIG. 1, a fold mirror (1) located to receive the S polarized image light from an image generator (2) and to reflect such S polarized image light; a quarter-wave plate (3) positioned so that the S polarized image light reflected from the fold mirror (1) is transmitted through said quarter-wave plate (3) and retarded by one-quarter wave in order to exit the quarter-wave plate (3) as circularly polarized image light; and a reflective combiner (4) situated to receive the circularly polarized image light from the quarter-wave plate (3), reflect such circularly polarized image light, combine such circularly polarized image light with light rays transmitted through said reflective combiner (4) from the surrounding environment, and transmit the combined environmental light rays and circularly polarized image light through the quarter-wave plate (3), which again retards the circularly polarized image light by one-quarter wave so that it exits the quarter-wave plate (3) as P polarized light which then passes through the fold mirror (1) with the environmental light rays and subsequently reaches the eye position (5) of the user, as also do the environmental light rays with which the image light has been combined. The optical path (6) of the image light is displayed in FIG. 1.

When the circularly polarized image light is reflected by the combiner (4), the handedness of the circularly polarized light is inverted, i.e., changed from left to right or from right to left.

Figure 2:
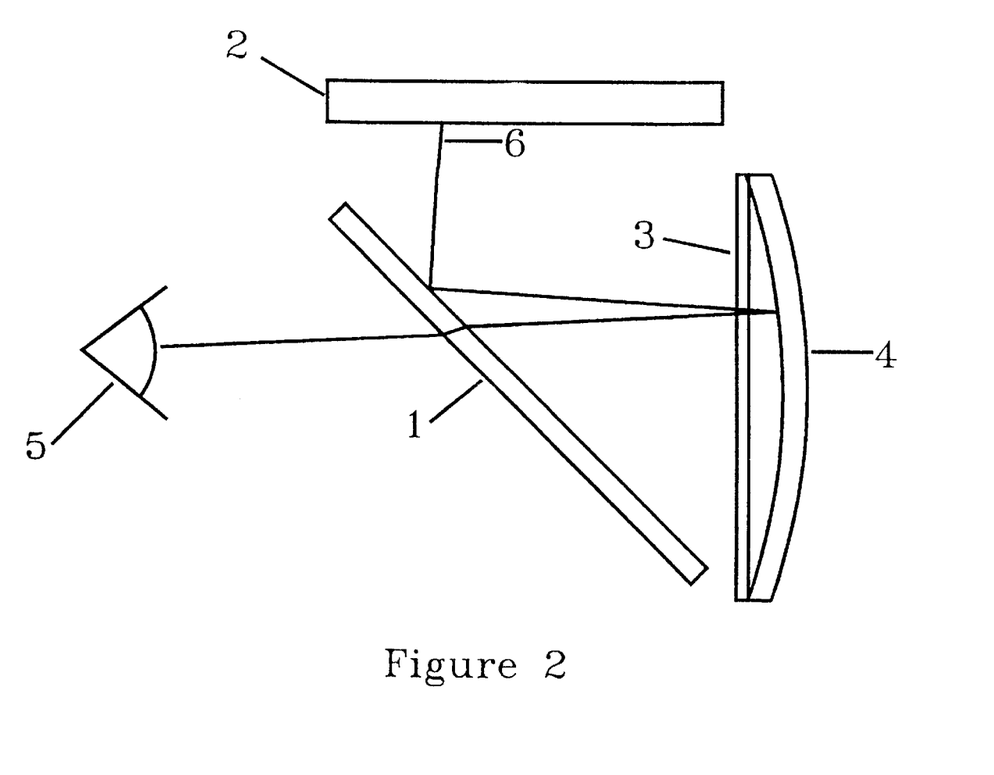
FIG. 2 portrays the same intensified visual display as FIG. 1 with the exception that the wave plate is attached to the reflective combiner.

Optionally, the quarter-wave plate (3) is, as shown in FIG. 2, attached to the reflective combiner (4).

The precise nature of the quarter-wave plate (3) is not critical. It is, however, preferable to employ a single-order plate so that dependence on angle and wavelength is minimized.

Quarter-wave plates are made from plastics and crystals or constructed holographically. A holographic wave plate is simply a high-frequency plane grating; the frequency is selected to be sufficiently high that the grating will not diffract light at any angle within the range of angles at which light may strike the grating in the intensified visual display. A plastic wave plate is, however, more dispersive, and has lower optical properties, than a crystalline or holographic wave plate.

Figure 3:
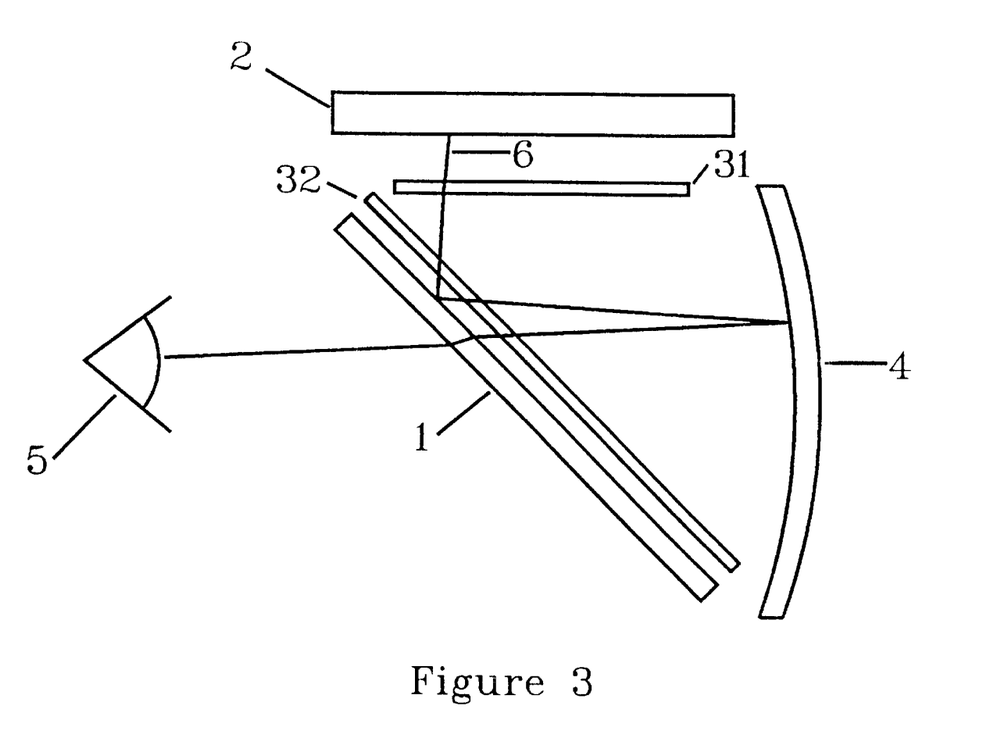
FIG. 3 illustrates the intensified visual display that is used when the image generator produces P polarized image light.

If the light from the image generator is P polarized, the user-mounted display comprises, as shown in FIG. 3, a first quarter-wave plate (31) located so that the P polarized image light from an image generator (2) is transmitted through said first quarter-wave plate (31) and retarded by one-quarter wave in order to exit the first quarter-wave plate (31) as circularly polarized image light; a second quarter-wave plate (32) positioned so that the circularly polarized image light from the first quarter-wave plate is transmitted through said second quarter-wave plate (32) and retarded by one-quarter wave in order to exit the second quarter-wave plate (32) as S polarized image light; a fold mirror (1) situated to receive the S polarized image light from the second quarter-wave plate (32) and to reflect such S polarized image light through the second quarter-wave plate (32) where the S polarized image light will again be retarded by one-quarter wave and, consequently, exit said second quarter-wave plate (32) as circularly polarized image light; and a reflective combiner (4) placed to receive the circularly polarized image light from the second quarter-wave plate (32), reflect such circularly polarized image light, combine such circularly polarized image light with light rays transmitted through the combiner (4) from the surrounding environment, and transmit the combined environmental light rays and circularly polarized image light through the second quarter-wave plate (32), which again retards the circularly polarized image light by one-quarter wave so that it exits the second quarter-wave plate (32) as P polarized image light which then passes through the fold mirror (1) with the environmental light rays and subsequently reaches the eye position (5) of the user, as also do the environmental light rays with which the image light has been combined. The optical path (6) of the image light is depicted in FIG. 3.

Again, when the circularly polarized image light is reflected by the combiner (4), the handedness of the circularly polarized light is inverted, i.e., changed from left to right or from right to left.

Figure 4:
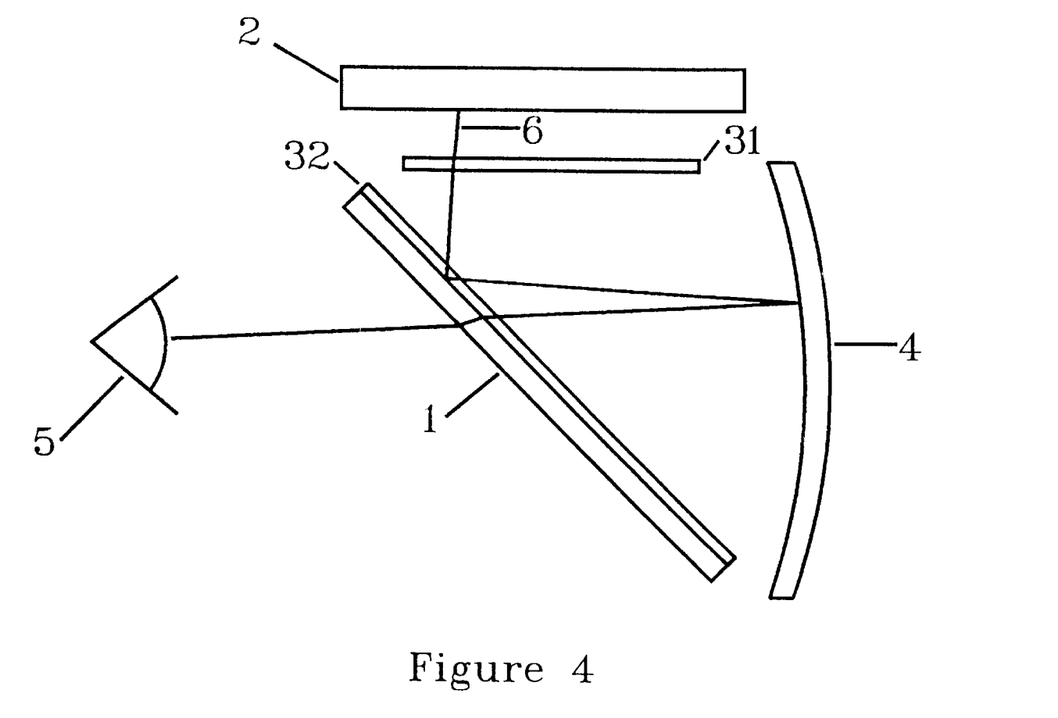
FIG. 4 depicts an intensified visual display which differs from the display of FIG. 3 only in that the second quarter-wave plate is laminated to the fold mirror.

The second quarter-wave plate (32) can optionally be laminated to the fold mirror (1), as portrayed in FIG. 4. This has the advantage of reducing the number of components which must be optically aligned. Additionally, it creates fewer surfaces on which an anti-reflective coating must be placed.

INDUSTRIAL APPLICABILITY

From the preceding it is obvious how the intensified visual display is made.

Industrial uses of the intensified visual display include, but are not necessarily limited to, providing a heads-up display or helmet-mounted display which enables a pilot or driver of a ground vehicle, such as military tank, to receive visual information about the pilot's plane or the driver's vehicle without looking away from the surrounding outside environment.

I claim:

1. An intensified user-mounted visual display comprising:
    an image generator that produces S polarized light;
    a fold mirror wherein said fold mirror is located with respect to said image generator to receive S polarized image light from said image generator without passing said S polarized image light through a relay lens between said image generator and said fold mirror and to reflect such S polarized image light;
    a quarter-wave plate positioned so that the S polarized image light reflected from the fold mirror is transmitted through said quarter-wave plate and retarded by one-quarter wave in order to exit the quarter-wave plate as circularly polarized image light; and
    a reflective combiner situated to receive the circularly polarized image light from the quarter-wave plate, reflect such circularly polarized image light, combine such circularly polarized image light with environmental light rays transmitted through said reflective combiner from the surrounding environment, and transmit the combined environmental light rays and circularly polarized image light though the quarter-wave plate, which again retards the circularly polarized image light by one-quarter wave so that it exits the quarter-wave plate as P polarized image light which then passes through the fold mirror with the environmental light rays and subsequently reaches the eye position of the user, as also do the environmental light rays with which the image light has been combined.

2. The intensified visual display as recited in claim 1, wherein:
    the quarter-wave plate is attached to the reflective combiner.

3. A user-mounted intensified visual display comprising:
    an image generator that produces P polarized light;
    a first quarter-wave plate located so that the P polarized image light from said image generator is transmitted through said first quarter-wave plate and retarded by one-quarter wave in order to exit the first quarter-wave plate as circularly polarized image light;
    a second quarter-wave plate positioned so that the circularly polarized image light from the first quarter-wave plate is transmitted through said second quarter-wave plate and retarded by one-quarter wave in order to exit the second quarter-wave plate as S polarized image light;
    a fold mirror wherein said fold mirror is situated with respect to said image generator to receive the S polarized image light from the second quarter-wave plate without passing through a relay lens between said image generator and said fold mirror and to reflect such S polarized image light through the second quarter-wave plate where the S polarized image light will again be retarded by one quarter-wave and, consequently, exit said second quarter-wave plate as circularly polarized image light; and
    a reflective combiner placed to receive the circularly polarized image light from the second quarter-wave plate, reflect such circularly polarized image light, combine such circularly polarized image light with light rays transmitted through the reflective combiner from the surrounding environment, and transmit the combined environmental light rays and circularly polarized image light through the second quarter-wave plate, which again retards the circularly polarized image light by one-quarter wave so that it exits the second quarter-wave plate as P polarized image light which then passes through the fold mirror with the environmental light rays and subsequently reaches the eye position of the user, as also do the environmental light rays with which the image light has been combined.

4. The intensified visual display as recited in claim 3, wherein:

the second quarter-wave plate is laminated to the fold mirror.

5. A process for intensifying the image light transmitted to the eye position of the user of a user mounted visual display comprising:

producing image light by an image generator wherein said image light is S polarized locating a fold mirror with respect to said image generator to receive S polarized image light from the image generator without passing through a relay lens between said image generator and said fold mirror to reflect such S polarized image light;

positioning a quarter-wave plate so that the S polarized image light reflected from the fold mirror is transmitted through said quarter-wave plate and retarded by one-quarter wave in order to exit the quarter-wave plate as circularly polarized image light; and situating a reflective combiner to receive the circularly polarized image light from the quarter-wave plate, reflect such circularly polarized image light, combine such circularly polarized image light with light rays transmitted through said reflective combiner from the surrounding environment, and transmit the combined environmental light rays and circularly polarized image light through the quarter-wave plate, which again retards the circularly polarized image light by one-quarter wave so that it exits the quarter-wave plate as P polarized image light which then passes through the fold mirror with the environmental light rays and subsequently reaches the eye position of the user, as also do the environmental light rays with which the image light has been combined.

6. The process for intensifying the image light transmitted to the eye position of the user of a visual display when the image light produced by the image generator with which the process is used is S polarized, as recited in claim 5, further comprising:

attaching the quarter-wave plate to the reflective combiner.

7. A process for intensifying the image light transmitted to the eye position of the user of a user-mounted visual display comprising:

producing image light by an image generator wherein said image light is P polarized;

locating a first quarter-wave plate so that the P polarized image light from an image generator is transmitted through said first quarter-wave plate and retarded by one-quarter wave in order to exit the first quarter-wave plate as circularly polarized image light;

positioning a second quarter-wave plate so that the circularly polarized image light from the first quarter-wave plate is transmitted through said second quarter-wave plate and retarded by one-quarter wave in order to exit the second quarter-wave plate as S polarized image light;

situating a fold mirror to receive the S polarized image light from the second quarter-wave plate without passing through a relay lens between said image generator and said fold mirror and to reflect such S polarized image light through the second quarter-wave plate where the S polarized image light will again be retarded by one quarter-wave and, consequently, exit said second quarter-wave plate as circularly polarized image light; and placing a reflective combiner to receive the circularly polarized image light from the second quarter-wave plate, reflect such circularly polarized image light, combine such circularly polarized image light with light rays transmitted through the reflective combiner from the surrounding environment, and transmit the combined environmental light rays and circularly polarized image light through the second quarter-wave plate, which again retards the circularly polarized image light by one-quarter wave so that it exits the second quarter-wave plate as P polarized image light which then passes through the fold mirror with the environmental light rays and subsequently reaches the eye position of the user, as also do the environmental light rays with which the image light has been combined.

8. The process for intensifying the image light transmitted to the eye position of the user of a visual display when the image light produced by the image generator with which the process is used is P polarized, as recited in claim 7, further comprising:

laminating the second quarter-wave plate to the fold mirror.

9. User-mounted apparatus for providing image light comprising:

an image generator;

a fold mirror which has greater transmissivity for light of a first polarity than for light of a second polarity, said fold mirror positioned, with respect to said image generator, to receive, from said image generator, image light substantially in said second polarity without passing through a relay lens between said image generator and said fold mirror and to reflect said image light in a first reflected direction;

a reflector positioned to receive image light reflected from said fold mirror and redirect at least a portion in a second reflected direction towards said fold mirror;

a polarization converter positioned to change the polarization of image light such that image light redirected from said reflector toward said fold mirror is substantially in said first polarity upon reaching said fold mirror for transmission of at least a portion of said image light through said fold mirror for subsequent transmission to a user's eye.

10. Apparatus, as claimed in claim 9, wherein said first polarization is S and said second polarization is P.

11. Apparatus, as claimed in claim 9, wherein said first polarization is P and said second polarization is S.

12. Apparatus, as claimed in claim 9, wherein said reflector is partially transmissive to provide for combining environmental light with said image light.

13. Apparatus, as claimed in claim 9, wherein said polarization converter includes a waveplate.

14. Apparatus, as claimed in claim 9, wherein said polarization converter includes a holographic optical element.

15. Apparatus, as claimed in claim 9, wherein said polarization converter includes a non-holographic optical element.

16. User-mounted apparatus for providing image light to a user's eye comprising:

an image generator;

first light direction-changing means positioned, with respect to said image generator, to receive image light from said image generator without passing through a relay lens between said image generator and said fold mirror and to reflect said image light in a first reflected direction wherein said direction changing means has at least partial transmissivity and which has greater transmissivity for light of a first polarity than for light of a second polarity wherein said image light, when received at said first light direction-changing means from said image generator, is substantially in said second polarity;

second light direction changing means positioned to receive image light reflected from said first direction changing means and redirect at least a portion in a second reflected direction towards said first direction-changing means;

means for changing the polarization of image light such that image light redirected from said second direction-changing means toward said first direction-changing means is substantially in said first polarity upon reaching said first direction-changing means for transmission of at least a portion of said image light through said first light direction-changing means for subsequent transmission to a user's eye.

17. Apparatus as claimed in claim 16, wherein said first direction-changing means include a fold mirror.

18. Apparatus as claimed in claim 16, wherein said second direction-changing means is partially transmissive to provide for combining environmental light with said image light.

19. Apparatus, as claimed in claim 16, wherein said second direction-changing means is substantially reflective to substantially avoid combining environmental light with said image light.

20. A method for conveying light to a user's eye, comprising:

providing an image generator;

providing a first reflector which has greater transmissivity for light of a first polarity than for light of a second polarity;

positioning said first reflector with respect to said image generator so as to receive at least a portion of image light from said image generator without passing through a relay lens, said image light having substantially said second polarity, and reflect said image light in a first reflected direction, using said first reflector;

redirecting said image light toward said first reflector;

changing the polarization of image light such that image light redirected toward said first reflector is substantially in said first polarity upon reaching said first reflector for transmission of at least a portion of said image light through said first reflector for subsequent transmission to a user's eye.

* * * * *